US012749410B2

(12) United States Patent
Jones

(10) Patent No.: US 12,749,410 B2
(45) Date of Patent: Sep. 29, 2026

(54) HAND-1 FINGER TRAINING DEVICE

(71) Applicant: Robert A. Jones, Canton, MI (US)

(72) Inventor: Robert A. Jones, Canton, MI (US)

( * ) Notice: Subject to any disclaimer, the term of this patent is extended or adjusted under 35 U.S.C. 154(b) by 0 days.

(21) Appl. No.: 16/587,021

(22) Filed: Sep. 29, 2019

(65) Prior Publication Data

US 2021/0097881 A1 Apr. 1, 2021

(51) Int. Cl.
*G09B 15/06* (2006.01)
*G10H 3/14* (2006.01)

(52) U.S. Cl.
CPC ............. *G09B 15/06* (2013.01); *G10H 3/143* (2013.01); *G10H 2220/525* (2013.01)

(58) Field of Classification Search
CPC ... G09B 15/06; G10H 3/143; G10H 2220/525
USPC ........................................................... 84/465
See application file for complete search history.

(56) References Cited

U.S. PATENT DOCUMENTS 1,848,920 A 3/1932 Watson
4,065,995 A * 1/1978 Greer ..................... A63B 23/16 84/465
4,112,804 A 9/1978 Cecchini
5,208,410 A * 5/1993 Foley ....................... G10D 3/04 84/298
5,756,914 A 5/1998 Streibl
5,811,704 A 9/1998 Anderko
6,127,615 A 10/2000 Rosenberg
7,157,633 B1 1/2007 Kopesec
7,304,224 B1 * 12/2007 Bettis ..................... G09B 15/06 84/293
8,581,083 B2 11/2013 Van Wagoner
8,642,859 B1 2/2014 Valenti
8,878,042 B2 * 11/2014 Van Wagoner .......... G10G 1/02 84/293
9,280,957 B1 * 3/2016 Chaves .................... G10D 1/05
2005/0109196 A1 5/2005 Whiteside
2012/0240744 A1 9/2012 Van Wagoner
2014/0109747 A1 * 4/2014 Van Wagoner .......... G10D 1/08 84/293

FOREIGN PATENT DOCUMENTS

CN 209357450 U * 9/2019
JP 2014092638 A * 5/2014

* cited by examiner

*Primary Examiner* — Jianchun Qin
(74) *Attorney, Agent, or Firm* — Clark Hill PLC

(57) ABSTRACT

This invention allows a person to train a strumming and picking with a small compact device usable in situations where a guitar is not practical. Multiple string features are attached to a base feature and spaced to allow a user's fingers or plectrum to engage and release in a manner similar with a guitar or stringed instrument. Device is a simplified interface to avoid mechanically tuned strings and allow practice of rhythm techniques. A user connection feature allows the device to be held relative to the user.

18 Claims, 8 Drawing Sheets

HAND-1 FINGER TRAINING DEVICE

BACKGROUND OF THE INVENTION

This invention allows a person to train a strumming and picking hand and fingers for improvement of guitar and stringed instrument playing.

An initial device variant was discovered plucking small molded tabs on a fast-food cup lid. These tabs or stubs provided tactical and acoustic feedback upon finger plucking. A guitar has linear and parallel direction strings. Circular orientated 'cup-lid' tabs were less than ideal for guitar training of fingers. This inspired design investigations. A device variant was built having linear and parallel guitar picks sandwiched between wood blocks; picks were half exposed to provide parallel oriented tabs representing guitar strings. This device was built to at least partially embody REGION 101 of FIG. 1. Partially exposed picks (tabs or string-features) could be engaged by fingers similar to guitar strings. Device usability was increased significantly by adding a connection feature to a belt around a user's waist. This controlled relative position of the device such that it remained relatively stable during user-initiated strumming, picking, and plucking.

DESCRIPTION OF PRIOR ART

Many training devices are commercially available to help guitar players improve their skills. Available devices can be categorized in several groups, including electronic devices, miniature guitars and/or minimized guitars, truncated fretboard devices, fret-finger dexterity tools and finger strength trainers. Some of these devices include actual guitar hardware, which may include a neck or partial neck, frets, strings and more. Guitars and other stringed instruments are generally composed of a base or body, neck, strings, and hardware. Hardware can be used to attach parts together, tune strings, and facilitate sound amplification. Stringed-instrument necks generally extend a distance from a body or base-feature to facilitate a required scale length which allows typical frequency for string vibration and sound for that instrument. Necks typically provide fret features for strings to be finger-clamped or fretted; this changes frequency and or tone for string vibration. Physical size and sound volume of a guitar can dissuade a user from practice in many situations, including a tightly packed bus or airplane. Neck length is a primary reason for physical size of a guitar. A guitar training device without concern for a neck or neck features may be significantly reduced in physical size, allowing users to practice relevant guitar techniques in many areas and situations where a guitar is not practical.

Playing a guitar generally involves utilization of two hands: including a Hand-1 and a Hand-2 and their associated fingers. Finger duties for a Hand-1 include picking, plucking, and/or strumming string(s) generally in Region 101 of FIG. 1. Finger duties for Hand-2 include pressing strings on neck and/or frets to effectively change string tone, generally in region 102 of FIG. 1. Available guitar training devices focus almost entirely on Hand-2 duties using neck features or region 102 of a guitar, training fingers of aforementioned Hand-2 fretting strings.

Miniature guitars, minimized guitars, and travel guitars will be referred to collectively as miniature guitars; they usually involve both hands to operate. Truncated necks and fret-finger trainers have a fret-region and string features to train Hand-2 duties on Region 102 in FIG. 1. Region 102 generally has frets or fret-features which run transverse to the string-features. Training Hand-2 duties with a fret-finger training device improves a user's ability to fret strings, effectively working on user's ability to change a sound pitch or frequency of guitar strings.

Finger strength training devices make no attempt to represent guitar features. Devices used to build finger strength can be beneficial for guitar, rock-climbing, and many other activities. In summary, many training devices exist that are useful for guitar players to develop finger and hand strength for Hand-2 duties.

A training device for the user's Hand-1 can allow practice of strumming, finger picking, plectrum picking, syncopation, rhythm, endurance, and much more. These skills can be useful for many stringed instruments such as guitar, bass, banjo, harp, violin, and more. In general, a guitar user conforms and orients a Hand-1 to allow finger and hand motion-paths which are substantially perpendicular to the strings. This strumming motion path allows dynamic engagement and release of string-features. A guitar provides acoustic response and strings provide tactical feedback to the use's fingertips. Practice on a guitar or training device allows a user to develop unconscious muscle memory for these Hand-1 duties.

Guitars and bass guitars have string-features that extend through both regions 101 and 102 of FIG. 1. Even though the strings are continuous, the string height is different for region-101 vs region-102. String height is generally minimized in Region 2 of FIG. 1 in order to reduce the finger effort to press the string onto the fret surface; minimizing height also reduces intonation change from string-bending to reach the fret. String vibration and elliptical orbit prevent luthiers from a desired extremely low string height in region-102 of FIG. 1. String-feature height in region-102 of FIG. 1 is typically between 0.02 and 0.12 inch plus the string thickness. String thickness typically varies from 0.01-0.105 for guitars and bass guitars. Region 101 of FIG. 1 contains the exact same strings, and therefore the exact same string-thicknesses, however the region-101 string-height dimensions are larger. These larger heights allow more room for fingers and picks to engage the strings without the base-feature or guitar body interfering. Region-101 of FIG. 1 commonly has string heights of 0.5 inch and more in the region typically used for finger and pick engagement. Magnetic pickups are closer to strings to help generate sound amplification. String-feature height can be a significant differentiator for devices designed to train fingers for region 101 vs region 102 of FIG. 1.

Many Hand-2 devices do not have features to attach onto a person. Holding a Hand-2 device uses a HAND-2 guitar fretting lobster pinch-grip method, which does not lend itself well for user-attachment. Many devices exist for improving Hand-2 capabilities.

Consumers looking to improve their Hand-1 capabilities for guitar REGION 101 of FIG. 1 have very limited, if any options. Miniature and truncated guitars are difficult to use in many situations due to size.

No training device has been found which focuses exclusively on improving a guitar player's strumming or picking hand and fingers. Patent literature search has found a description of a rhythm device. This patent describes a device for practicing rhythm and strumming. The specification for this tunable device provides abundant detail for screws and string tension adjustment features. Further, legal claims require screws or adjustable tension. This literature described device follows in paradigm with virtually every guitar and/or stringed instrument commercially available: adjustable tension strings are mandatory. A Hand-1 training device which does not require string tension adjustment is not available to consumers. The added complications of screws for adjusting string tension, or even the fact of having adjustable string tension is complex and degrades from the simplicity of a training device. Lack of commercial availability for the "literature described tunable rhythm device" indicates low practical utility.

Eliminating the concept of mechanically tuned strings can provide a simplified user experience; and can contribute to a lower device cost. Variants of the device described for this application can have either adjustable tension or fixed tension or zero tension string-features.

All Hand Training Devices Suffer from Different Disadvantages:

a. To big
b. Too complex
c. Too expensive
d. No features to practice rhythm
e. String-feature height-dimension designed for region 102

Besides the Objects and Advantages Described in this Patent Application, Advantages Include:

f. To provide a training device to improve skills for playing a stringed instrument,
g. To provide a small portable rhythm training device,
h. To provide tactile and/or acoustic feedback to user input,
i. To provide a simple hand and finger training device.
j. String-feature height-dimension designed for region 101

REFERENCES IN DRAWINGS

101—H1 region
102—H2 region
103—string feature
104—connection feature
105—base feature
106—subdivision
107—string feature sandwiched by other features.
108—fastener
D1—base feature width
D2—base feature length
D3—a hand width
D4—string feature spacing
D5—string feature height
D6—String feature length
D7—String feature thickness
D8—Base feature height

BRIEF DESCRIPTION OF DRAWINGS

Other variations will become clear when the present invention is understood from the description given and drawings. Features in drawings are labeled to provide a detailed understanding of the present invention. Repetitive features and associated dimensions can be clearly understood in the drawings by comparison with substantially identical labeled items. Variations in features are intentionally mixed to minimize drawings and show some of the possible variants for this application. Even more variants that are not shown can easily be imagined, after reviewing the drawings and descriptions in this application.

DESCRIPTION OF DEVICE VARIANTS

Figure 1:
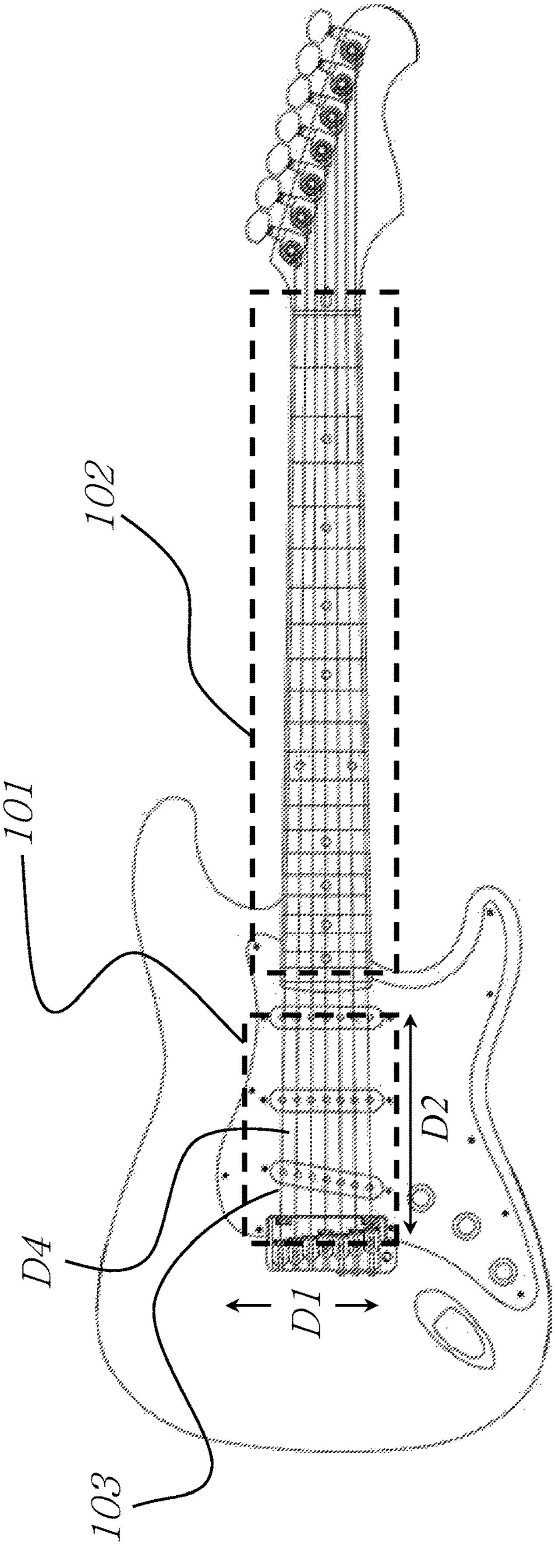
FIG. 1 is a front view of a guitar which shows a typical layout of body, neck, strings and hardware. Region 101 is a region where strings are typically picked, plucked, and/or strummed. Region 102 is a region where strings are typically fretted. Item 103 identifies a string. Dimension D1 identifies a base-feature width. Dimension D2 identifies a base-feature length. Dimension D4 identifies a space between two strings.

As can be imagined by these drawings and descriptions, any number of design variants can be constructed to deliver the functionality fora hand-1 training device. Description and illustration of variants herein will in-turn lead to other variants which can easily fall within the claims for this application.

Fingers, thumbs and picks may be used to interact with Guitar-device strings and/or string features. For this document, the term finger can include thumbs, fingers, picks and anything that might be used to pluck and/or strum a guitar. In addition, the definition for a user and/or person can include appendages and clothing items, belts, suspenders and other apparel involved with the user.

A hand-1 training device includes strings features. Preferred string-features have a primary linear dimension and provide finger tactical feedback roughly in a direction of finger motion. Finger motion is roughly perpendicular to the string-feature's primary linear dimension; string feature orientation is representative of Region 101 of FIG. 1.

A string-feature may be a string or wire, or may be a protruding edge, a linear element, a linear profile, a protruding stub, or the like. Many qualities and quantities can help define string-features. Some of these qualities and quantities impart interaction, touch, sound, feel, and ultimately usability and satisfaction for a training device user. These qualities and quantities comprise material type, shape, thickness, length, width, stiffness, height, attachment, color, mass, quantity, spacing, sound and further items not explicitly listed. A training device having a single string-feature can be useful but is essentially of limited benefit. A Hand-1 training device being described herein has between two and ten string-features, with a preference of four, or five, or six. String-feature spacing and/or thickness has importance to a usability of this device. Commercially available guitars and stringed instruments utilize many different string thicknesses on a single instrument. String feature thicknesses of a device can be tailored to provide feel, or touch/tactical feedback representative of a guitar or bass, or other stringed instrument. Alternatively, some or all string-features may have a common thickness. This device is not defined by string thickness, however, string features having thickness between 0.003" and 0.3" (inch) provides satisfactory functional and/or tactical user feedback. Preferable string-feature thickness for this device described herein will be between 0.010 inch and 0.12 inch. String features for devices tailored for practicing bass guitar are likely to employ thicker string features as compared with devices tailored for practicing guitar. Thickness for a hollow string features is characterized by the external dimensions.

Generally, string feature shape dimension will comprise of length and thickness, and in some cases width. These feature-based dimensional quantities help to define some aspects for shape; however, these quantities are general in nature and may describe shapes which are relatively long and flat, short and flat, long and round, long with a cross-section, short with cross-section, and many other combinations not explicitly stated.

String-feature thickness, length, stiffness, size, mass and other items can provide for many device variants; effectively providing variations on tactile response, tonal response, and feel-response provided to the user's fingers. User's preference for string-feature thickness, stiffness, and size may result from the user's particular instrument preference and playing style. Stiffness is associated with material type, string-feature dimensions and shape. The dimensional contribution to stiffness is well documented in engineering literature for mechanics of materials. String-feature with soft stiffness can help provide a smooth feel and possibly less harsh experience for a device user. Conversely, stiff string-features provide a different user experience. Again, string-feature dimensions can result in multiple variants for hand-1 training devices; some hand-1 device variants may have string-feature dimensions similar with an instrument, such as a guitar, bass-guitar, or other instrument of choice.

Figure 3:
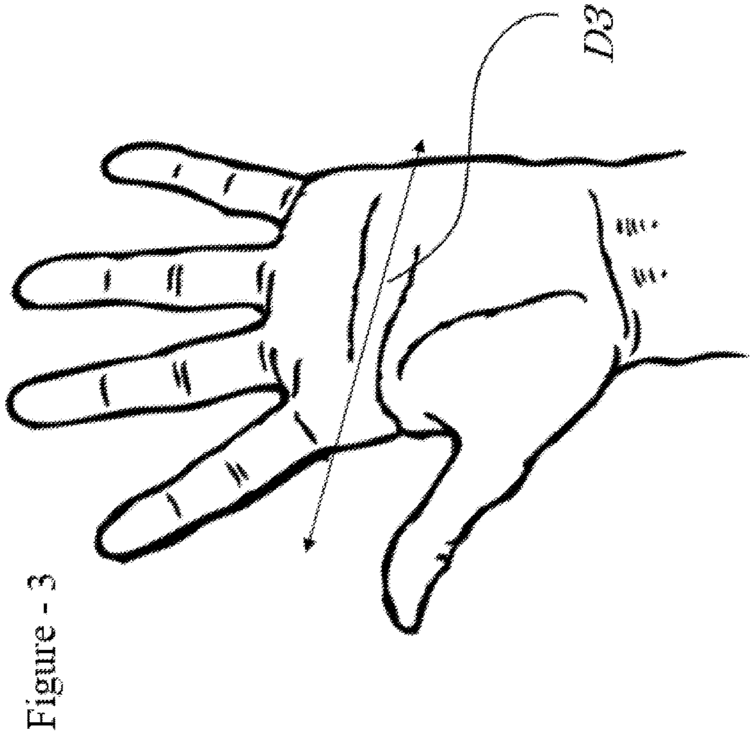
FIG. 3 shows a typical user hand, and a hand width dimension D3.
Figure 2:
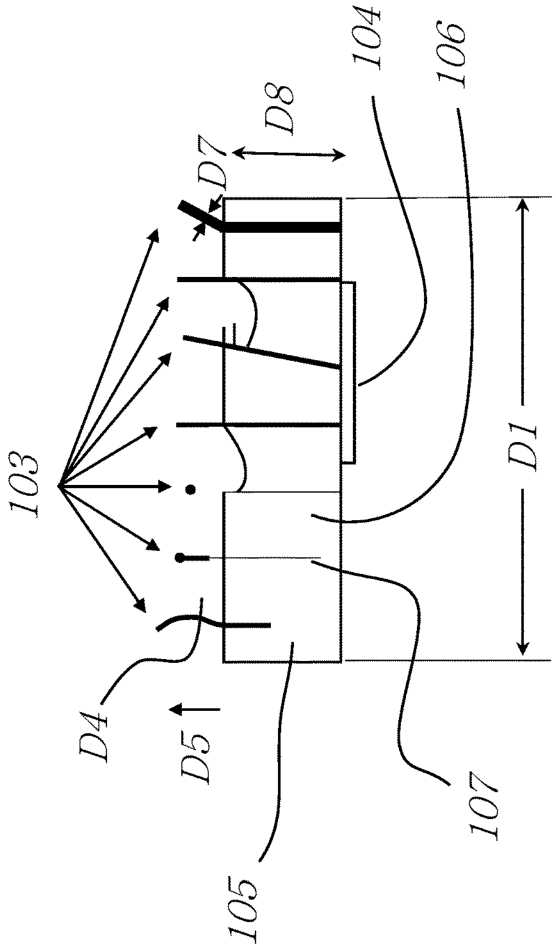
FIG. 2 shows a section view of a finger training device variant; the section view is perpendicular to the length of the string-features, 103.
Figure 4:
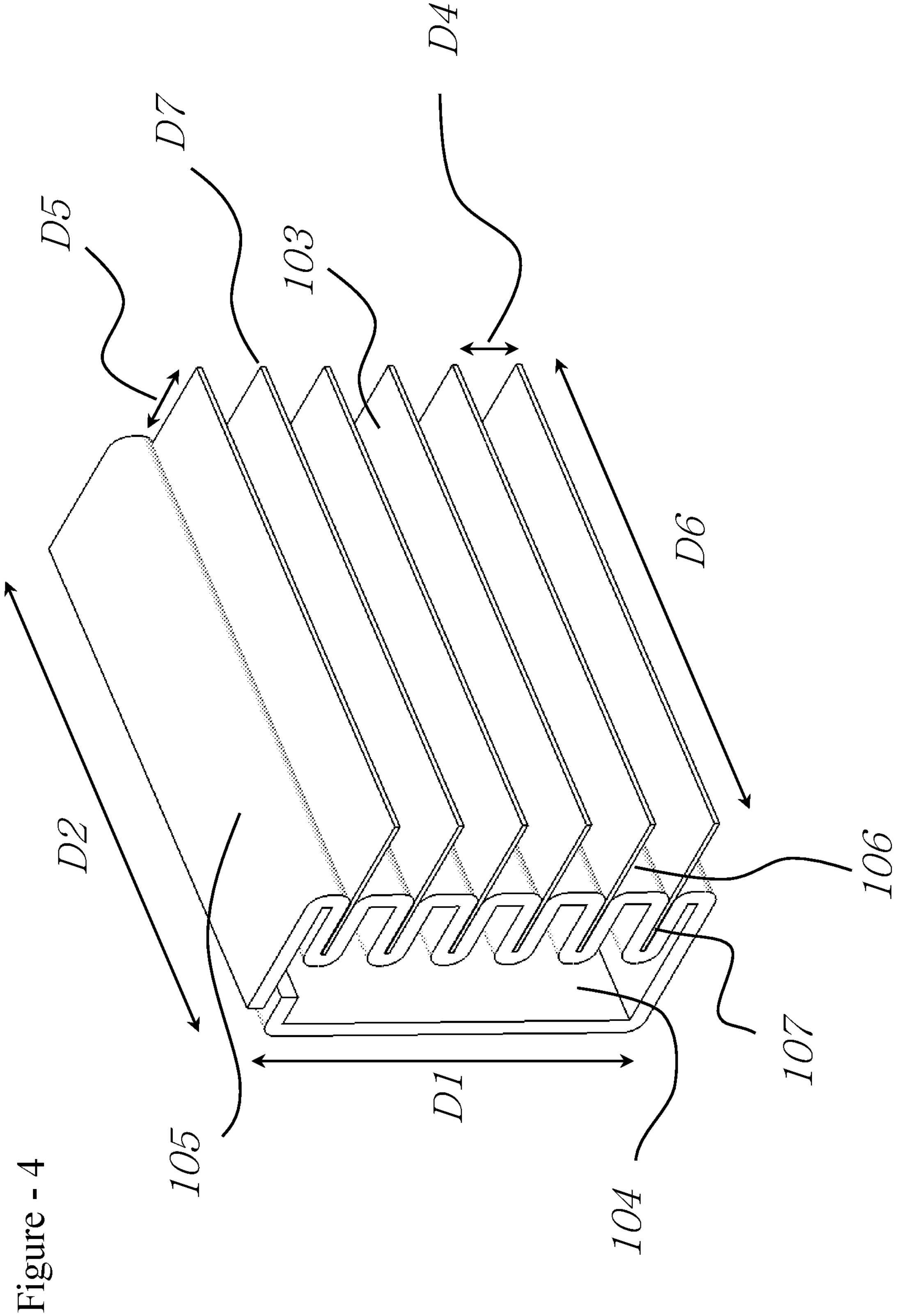
FIGS. 4, 5, 6, and 7 shows hand-1 finger training device variants with multiple examples of string-features, 103; multiple examples of base-features 105; many subdivision examples, 106; sandwich features, 107; and further items and dimensions listed in the Drawing References.
Figure 5:
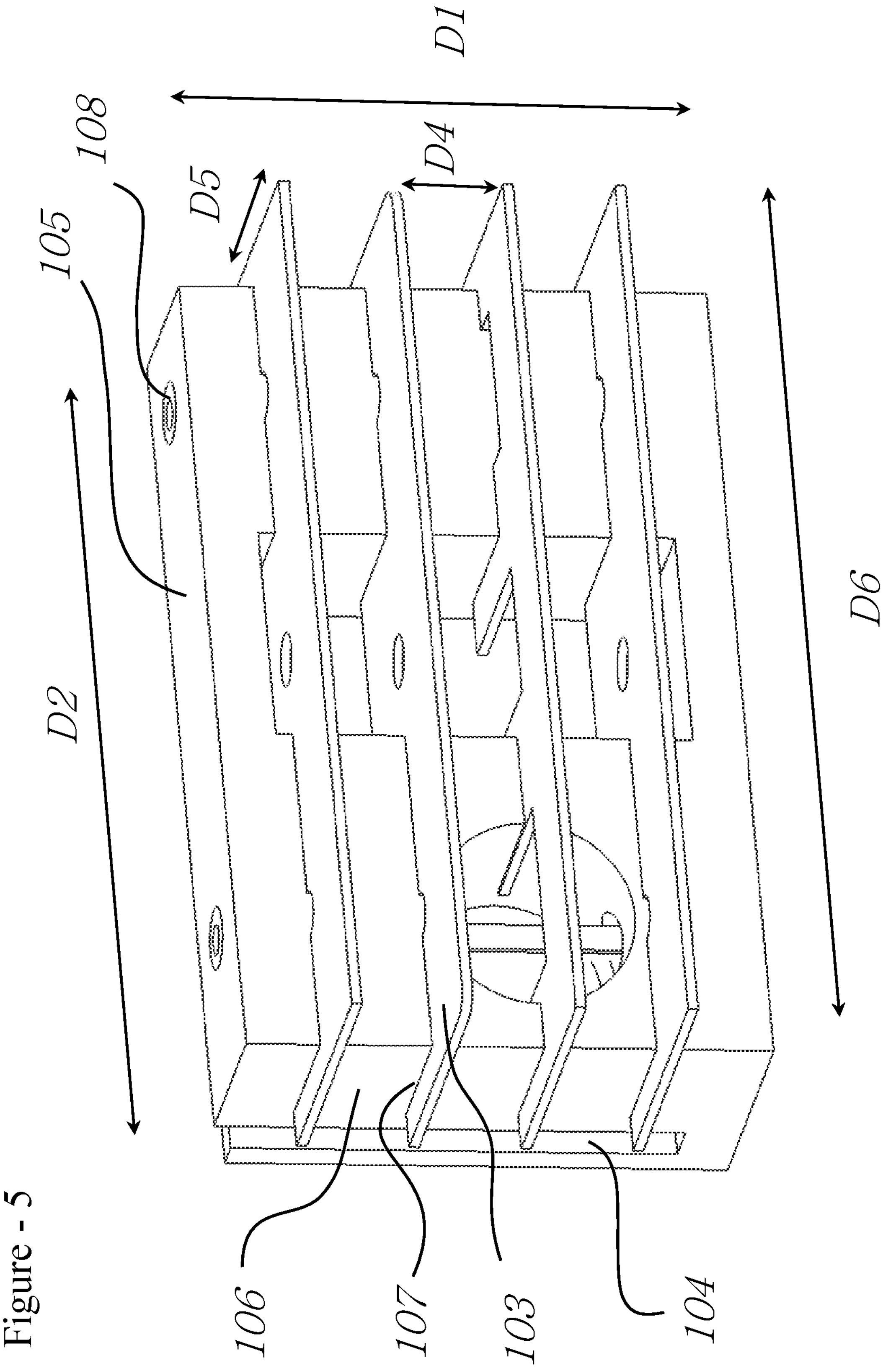
Figure 6:
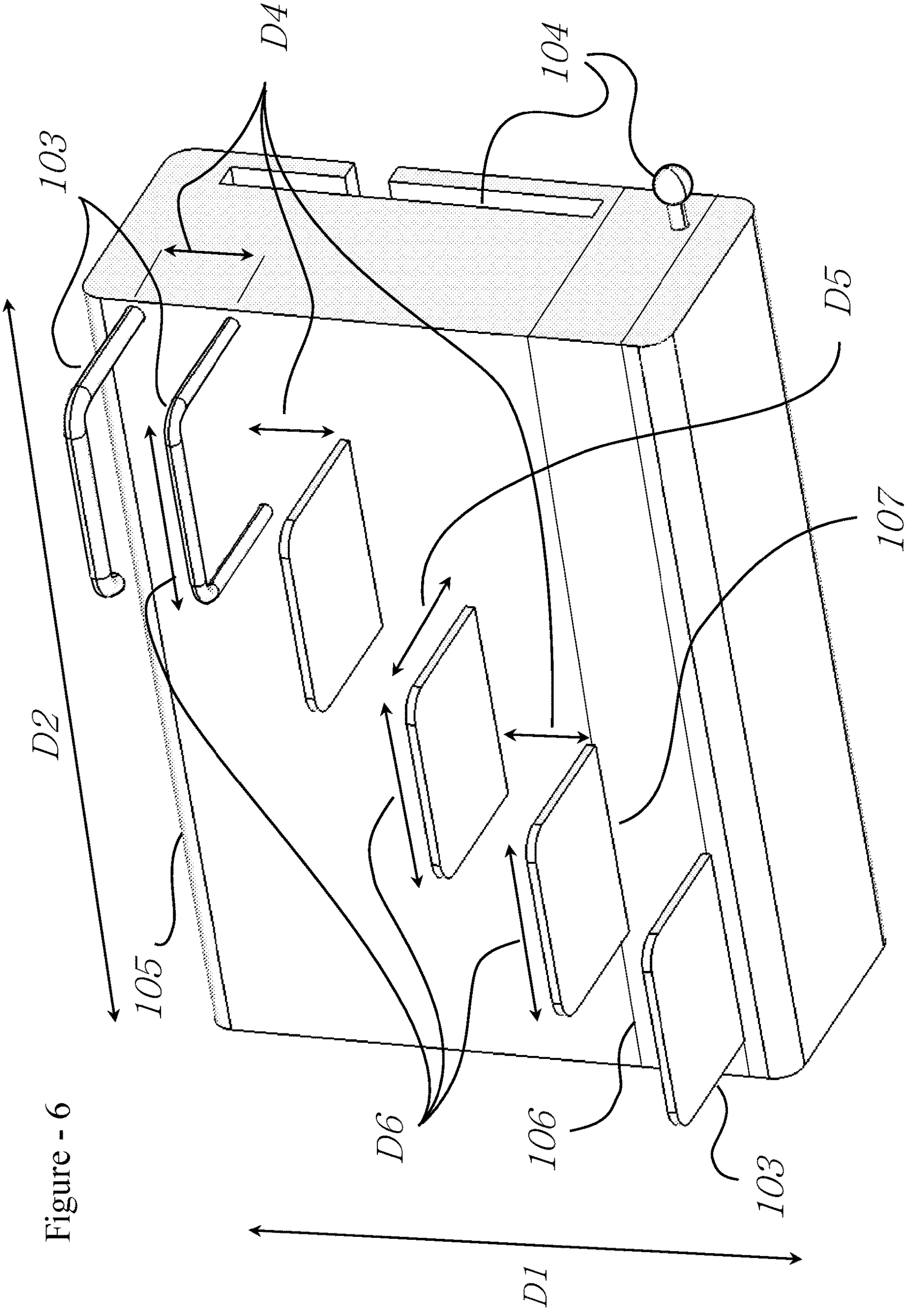
Figure 8:
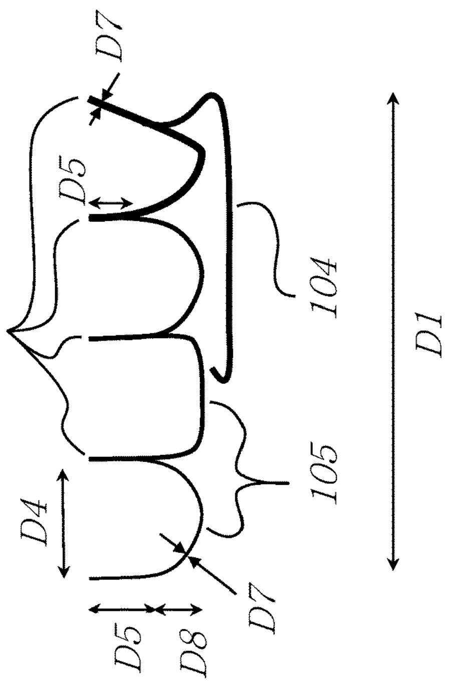
FIGS. 8, 9, and 10 show hand-1 finger training device variants sectioned perpendicular to the length of the string-features, 103. These figures show multiple examples of string-features, 103; multiple examples of base-features 105; subdivision examples, 106; sandwich features, 107; and further items and dimensions listed in the Drawing References.
Figure 7:
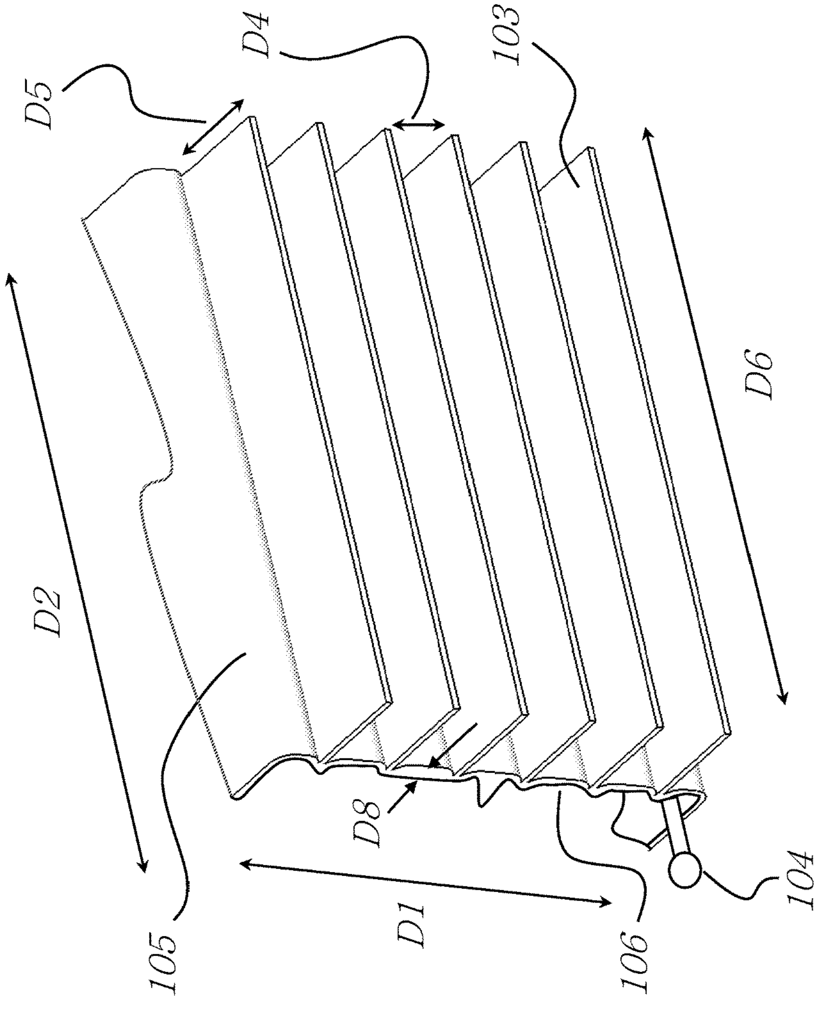
Figure 10:
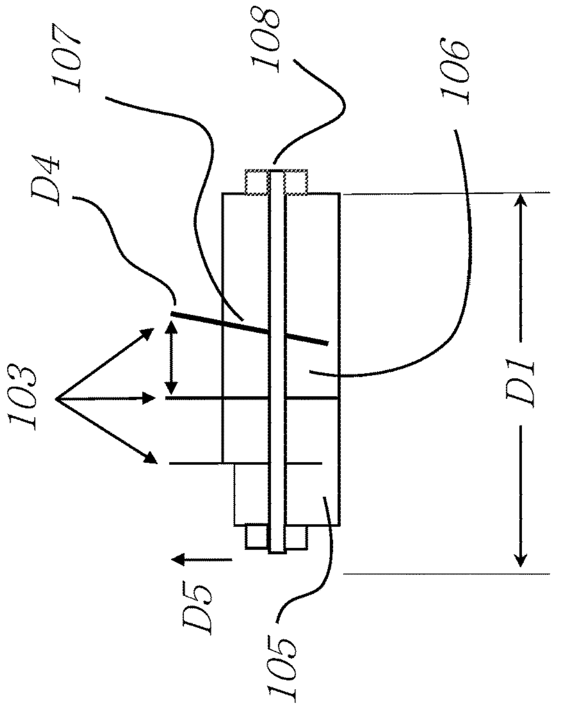
Figure 9:
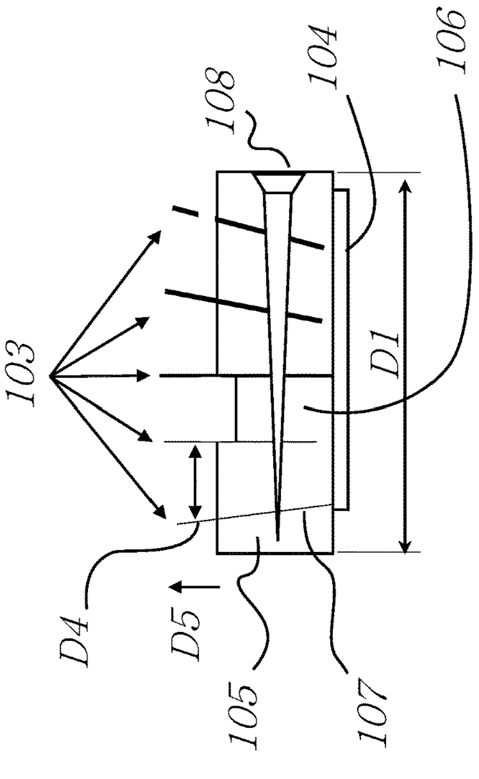
Figure 11:
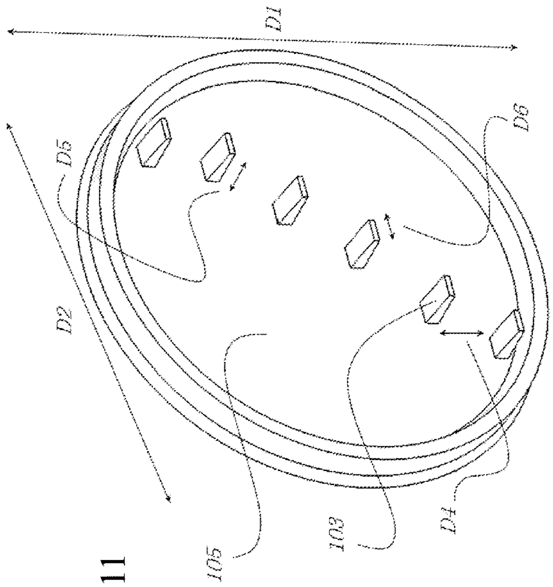
FIGS. 11, 12, 13, and 14 shows hand-1 finger training device variants with multiple examples of string-features, 103; multiple examples of base-features 105; many subdivision examples, 106; sandwich features, 107; and further items and dimensions listed in the Drawing References.
Figure 12:
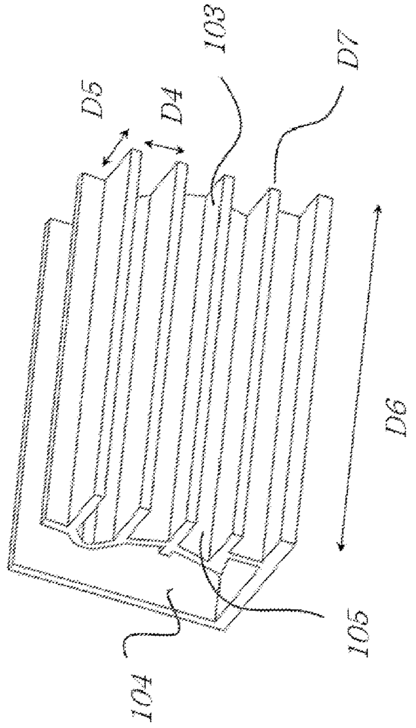
Figure 13:
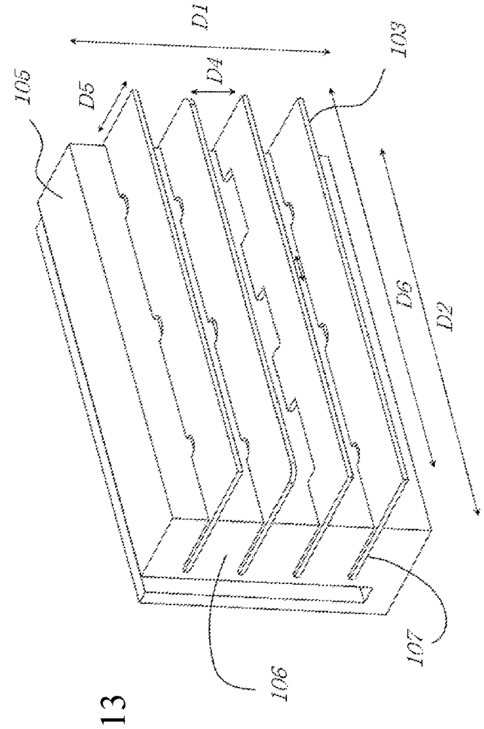
Figure 14:
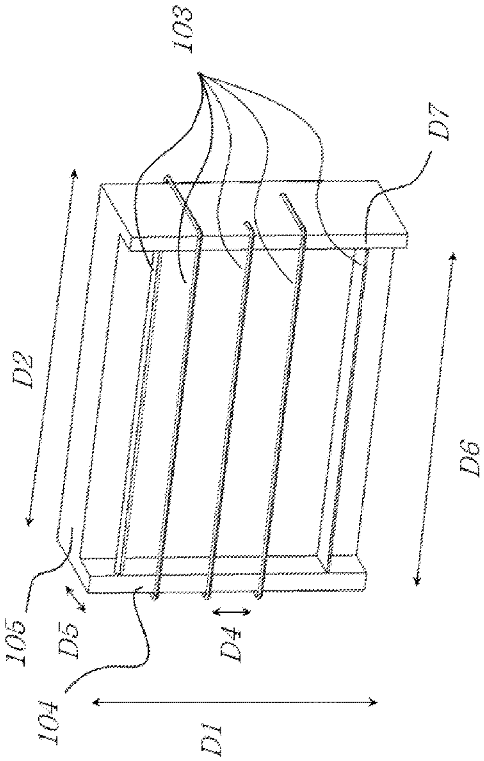

A Hand-1 device which is roughly sized to a human hand is both compact and functional for multiple hand sizes. Length of a string-feature can be short, mid-length, or long. String-feature variants can extend to a substantial portion of a Hand-1 device length-dimension, partial portion of a device-length, or be minimal in length. Minimal tab style string-features can be positioned on a base-feature to match separate finger arc-paths, as shown in FIG. 6 and FIG. 11. These are similar with variants mentioned in the Background of the Invention. String-feature length for a Hand-1 training device can be as long as an average guitar scale length; however, benefits are limited by the size. The smallest string-feature length constructed to this date can be gleaned from the fast-food drink lid example of around 0.1 inch long; however shorter lengths are possible. Normal string-feature length is roughly between 0.5" and 10" long; with a preferred device and string-feature length fitting to a person's hand width, Figure-3 dimension D3. A sample of human hand widths were measured between 2.5 inches and 6 inches. String-features which run a significant portion of a device length allows user fingers to engage string-features cognizant of FIG. 1, REGION 101. It is likely that commercial application for a device described by the present invention might be offered in different base-feature lengths and/or have different string feature lengths to accommodate different sized hands. With this in mind, string-feature thicknesses and spacings for actual stringed instruments are not necessarily sized to a user's hands, however a user's fingers may interact at different locations along the length of the string features. Commercially available stringed instruments may have slight variations in string-thickness and string-spacing which may give rise to preferences of users with particular hand sizes.

String-features are not limited by shape nor material. As previously described, string-features can be actual guitar strings, guitar picks, or a multitude of shapes and/or materials. String features may be comprised of plastic, polymer, wood, paper, plant-base, animal base, rubber, cardboard, metal, glass, composite, and many other materials.

Guitar strings are relatively free to vibrate about proximate extremity connections on an instrument. Wire type string-features can be sandwiched, pinned, screwed, wrapped or otherwise fixed to the end connection features. End connection features can provide adjustment of string-feature tension or provide no-adjustability for string-feature tension. The device described here for application employs simplicity as a feature. Effectively hand-1 training device variants isolate tasks for finger and hand skill training. Skill isolation can simplify learning experiences for training device users. Device simplicity is a feature.

Clearly, by the variance of string-feature examples, qualities, and quantities, string-feature shape can be any one of a multitude of possibilities.

Generally, stringed instruments including guitars have multiple strings and these strings are separated by a distance or space between each string. This distance between strings is sized wide enough such that fingers can access strings individually. Further, these distances are minimized such that multiple strings are available to the proximity of a user's Hand-1 and associated fingertips. The term finger and fingertip will be used synonymously herein. Multiple string-features and their accompanying distance between string-features comprises the region 101 of FIG. 1 for a stringed instrument. This region 101 of FIG. 1 is the area of interest for the present invention. The Hand-1 training device emulates features of this region 101 such that a user can develop muscle (finger) memory with a value sized training device.

Over the ages, luthiers and manufacturers have refined stringed instruments to meet the satisfaction of users. While differences do exist, the majority of stringed instruments have string-spacing, otherwise known as distances between string features, which are substantially common. A user must be able to engage a single string-feature and also be able to access other string-features. String-feature spacing is generally less than one inch but more than ⅛" for most instruments. A device variant with string features spaced greater than 0.75 inch is useful, however the wide spacing deviates from a target to represent region 1 of FIG. 1. Dimensional string-feature spacing preference is approximately 5/16" to ½" (inch). Other device variants employ some string features spaced closely together for unison finger engagement. A variant similar with a twelve-string guitar may have "string-sets" such that a user plucks or strums a string-set in place of a single string. String-feature set variants are applicable to this device however, they are not significantly different compared with devices having single string-features. Effectively a twelve-string variant can be viewed as a variant with six string-sets. Multiple string-features which are closely spaced together such that a fingertip will generally engage them together can be considered a single string-feature.

A Hand-1 training device employs a base-feature and a connection means for string-features. A base-feature may be comprised of many materials, including materials listed above for string-features. Materials need not be common between base-feature and string-features. Or, other device variants may have similar or even common materials between string-features and base-features. Base-features can be comprised of more than one material. Certain variants have string-features which meld or transition into a body feature. A base-feature shape and size can provide function and style. A device that fits in a coat-pocket allows portability and easy storage within clothing pockets. Base-feature shapes may be substantially rectangular or other various geometries. They could be similar with recognized guitar shapes (reduced in size) or any other recognizable shape, such as a heart, or the state of Michigan. A preferred device variant is sized compactly and shaped simply to allow guitar Hand-1 picking practice with minimal required space.

Dimensional qualities including length, width, and thickness are relative terms. These terms being relative to a component, assembly, or reference frame. Length of base-feature and length of string-feature remain directionally consistent between each other. However, thickness of string-feature and thickness of base-feature are non-consistent in direction. String features are assembled to a base-feature in a manner which orients a combined multitude of string-feature thicknesses and string-feature spacings to substantially provide a base-feature width: D1 shown in FIGS. 2, 4,5,6,7,8,9,10,11,12,13,14. Base-feature width can also be made wider than the distance from first to last string-feature by adding material to the base-feature external from the string features. Some base-feature variants employ at least one fastener to connect other features and/or subdivisions together. A few variants of fasteners can be visualized in FIGS. 2, 4,5,6,7,8,9,10,11,12,13,14. Many fastener types can be used including bolts, screws, nails, rivets, traps, sandwiches, wire, glue and others. Base-feature variants also may require no additional fastening means. Some Hand-1 training variants have string-features that transition into base-features, or even into subdivisions without visible distinction. Other variants have string-features that substantially connect directly together, appearing to not have a base-feature; in this case, the base feature is considered to be the material connecting adjacent string features.

Base-feature thickness and string-feature height are dimensions which help to define a Hand-1 training device, as shown in the illustrations, including FIGS. 2, 4, 5, 6, 7 8,9,10,11,12,13,14. Base feature thickness can be as thin as material properties allow or wide to similar with a guitar thickness. String-feature height can be dimensionally similar with a guitar and/or preferred stringed-instrument. Flat-shaped string-features have a unique interaction with string-feature height. Flat-shaped string-features, FIGS. 2, 4, 5, 6, 7 8,9,10,11,12,13,14 can emulated a characteristic feel which is comparable with a stringed instrument when the flat-shaped string-feature height and string-feature thickness allow compliant finger-engagement. This compliant engagement produces a unique and preferred user feel and acoustic response for the Hand-1 finger training device. In addition, flat-shape string-feature material choice also has contribution towards the feel and acoustic feedback. Wire-type string features, FIGS. 2, 6, 14 can be less-sensitive to string-feature height, as wire stiffness is not dependent on height. String-feature height can be very low, even shorter than 0.2 inch which can facilitate device compactness. However, the shortness provides minimal finger tactile feedback and little to no acoustic feedback for flat-shape string-features. Extreme variants can have string-feature heights up to several inches; this tends to make the device larger than necessary, and degrades acoustic feedback for flat-shape string-features. String-feature height is most commonly between 0.3 inch and 1.3 inch. String features can be bent, curved or otherwise formed. FIGS. 2, 4, 5, 6, 7 8,9,10,11, 12,13,14 depict a few string-feature variants. String-feature shape, thickness, and geometry can interact with string-feature height to provide specific user feedback. Some hand-1 training device variants will have string-feature heights which are substantially comparable on a singular device. String-feature heights can even vary slightly to form an arc or crown similar with a fret-board radius or guitar bridge radius. Further, a base-feature with subdivisions can be tailored for each string-feature to interact with the subdivision to refine user responses, including acoustics. Exposed string-feature can have an effect on audible feedback during use. Some sting feature variants provide a click or other acoustic response during use. A preferred non-amplified acoustic response is covered by claims, and is a function of material, thickness, height, mass, and other secondary items. Acoustic response during use is a function of certain string-feature and base-feature and subdivision properties, including mass, stiffness, geometry, shape and material type. This subject is documented phenomenon of mechanical vibration theory and practice. Sound amplification using electronics, sensors, and wireless communications is a variant of the Hand-1 training device described herein. Each string feature may produce a unique acoustic response, non-legible acoustic response, or a respond similar to other string features. Sensors, piezo-transducers, electronics and amplification can be used to alter and/or enhance the acoustic response for the user and others.

Connection of string-features to a base-feature can make use of mechanical connections, including mechanical connecting elements, clamps, clamping, sandwiching, insertion, screws, traps, bolts, welding, gluing, melding, wrapping, and many other joining approaches. String-feature shape, size, and dimensions are important for determining how string features are connected to a base feature.

Guitar players may use a strap to hold a guitar in relative position such that hands are free to perform their respective duties referenced earlier; including duties of Hand-1 and Hand-2. Alternatively, a guitar can rest on a leg or knee to locate a relative position. User connection features for guitar positioning allows both hands freedom to perform their Hand-1 and Hand-2 finger duties. Base-features are herein defined as to include straps and/or device base/body.

A user connection feature on a training device has significant benefit as allows Hand-1 duties, including picking, plucking, and strumming on a relatively stationary device. It allows a user freedom of a second hand to perform completely un-related tasks such as holding a book to read; a scenario which would be extremely challenging with a device unconnected to the user.

A relatively stationary device has minimal relative motion compared with a user's personal reference frame. A personal reference frame may be a user's hip, core, leg, arm, belt, suspender, pants, and/or other portion, and/or clothing attached to thereof. Examples of connection features include clips, clasps, snaps, u-bends, hook and loop fabrics, belts, articulating members, loops and many other possibilities. Quick connects are available for guitar straps. These mechanical actuated snap lock features are also applicable to a hand-1 type device. A connection feature can provide positioning close to a user or provide an offset such that the device is further outward from the user similar with how a guitar might position a hand. An adjustable connection feature allows a user to secure the device relative position which suits a user's preference.

A stationary reference frame allows a Hand-1 and/or finger-paths to remain oriented to the device and/or string-features during use. A device which remains relatively stationary allows a user to develop spatial relationship between fingers and string-features. Ultimately the device helps to develop muscle memory for hands and fingers which helps develop guitar playing skills. Given these facts it is clear a compact Hand-1 training device which incorporates at least one connection feature has significant benefits.

Variants of a hand-1 training device can incorporate string-features which originate and protrude from a base. Said protrusion can provide string-feature height similar to portions of FIGS. 2, 4, 5, 6, 7 8,9,10,11,12,13,14. These at-least partially exposed string-features allow finger engagement and tactile differentiation. Said string-features can be material protrusions, material strips, sheet material, thin plates, flat material, interrupted material, slit material, slotted material, and many other material geometries. Flat sheet material has associated length, width and thickness. Flat material is defined here as having a thickness which is significantly less than width or length dimensions. Certainly, flat material can be separated into strips or plates or platelets. The term plates will encompass platelets herein. These separated strips or plates being derived from flat material and having dimensions relative to an original flat sheet material. Strip and plate type string-features can provide for at least partial, and up to full, connection-means to a base-feature along a string-feature's length. String-features made of flat material can have bends, cut-outs, curves, end-configurations, edge configurations, and other shape configurations. FIGS. 2, 4, 5, 6, 7 8,9,10,11,12,13,14, show a sample of shape configurations. As can be seen with this small sample, there is an endless number of shape configuration possibilities for string-features.

A base-feature variant can be comprised of one or more subdivisions which can provide for string-feature spacing. Combining sheet-material derived string-features together with base-feature subdivisions can provide for variants of a hand-1 training device. Base feature subdivisions may dimensionally provide for string-feature-spacing, Dimension D4 in a base-feature-width direction, Dimension D1. Said subdivisions have length which can provide toward a base-feature length direction, Dimension D2. A base-feature subdivision may have dimensional contribution towards a base-feature height, Dimension D8. A base-feature comprised of multiple subdivisions can form a combined singular base-feature with multiple spaced sandwich features (107) for accepting string-features (103); variants of this can be seen in FIGS. 2, 4, 5, 6, 7 8,9,10,11,12,13,14. A base-feature variant can provide connection means for partially exposed string-feature strips. String feature strips can also be sandwiched and/or secured between subdivisions, and/or spaced connection features of a base-feature. String-feature length can be similar in dimension to a base-feature length; or can be differential in length similar with prior described variants. Base-feature variants need not have continuous material throughout a section. Section of a base variant can be thick, thin, hollow, filled, patterned, porous, or have virtually any material distribution.

Some base features may not even appear to be base features, but effectively are. An example of this is a material connection between string features as shown in FIGS. 7, 8,11,12. A simple material connection between string features can be a subdivision or base feature. The shape or geometry of this material connection can be any configuration or shape imaginable.

Still yet other variants include a base-feature having string-features formed, molded, created, and/or extruded as part of said base-feature. String-features in this described variant are mechanically connected to a base-feature through material and/or material interfaces. Manufacturing methods exist where string-features and base-feature(s) can be processed together as a single material, or with different materials in a combinable process. Extrusion is a process that may have benefit for manufacturing a multitude of features fora Hand-1 type training device. The extrusion process benefits from substantially equal thickness regions. String features and base features may appear indistinguishable where no distinct transition is apparent.

Even yet another variant device utilizes thin plastic material with molded as tabs; tabs effectively being string-features. FIG. 11 shows a device variant with molded tab string-features having "string-feature-spacing" in a width direction; and linear, substantially parallel orientation in a length direction. A fast-food drink lid could be designed with this variant.

A device can also have a hand-bridge. A resting spot for a hand-1 palm or partial palm to rest. Some guitar techniques utilize a palm placement on a guitar bridge. A hand-bridge feature would be dimensionally located at a proximate end of a device and provide a surface at or above string-feature height. This hand-bridge feature could be sized to much like a guitar bridge, providing a palm rest on string features.

As described above, a practicing guitar player has ample need fora compact picking/strumming hand and/or finger training device. No devices have been found to meet this need. Other devices all fall short of capabilities described herein the afore described hand-1 picking/strumming device.

Although embodiments of the present invention have been described in some detail by way of illustration and description for purposes of clarity of understanding, it is understood that many changes and modifications may be made within the spirit of the invention.

What is claimed is:

1. A stringed-instrument training apparatus comprising:
- a base having a top side, wherein the base has a size similar to that of a human hand;
- a plurality of connectors disposed on the top side of the base; and
- a plurality of string-features disposed on the plurality of connectors, wherein each of the plurality of string-features comprises:
  - a strip with a width, and a length, where a first lengthwise edge engages one of the plurality of connectors and a second lengthwise edge is exposed;
- wherein the connectors are configured to restrict lengthwise bending of the strips;
- wherein the width of each strip is selected to engage a finger, wherein each of the plurality of connectors is configured to restrict the lengthwise edge from bending when force is applied, and wherein each of the plurality of lengthwise edges is able to substantially impede the finger in a strumming direction; and
- wherein the each of the plurality of string-features is parallel to the others and adjacent string-features spaced apart by substantially the same distance as guitar strings.

2. The apparatus of claim 1, comprising three or more string-features.

3. The apparatus of claim 1, wherein each strip has a thickness greater than about 0.005 inch and less than about 0.25 inch.

4. The apparatus of claim 1, wherein the width above the top side is greater than 0.2 inches and less than 1.8 inches.

5. The apparatus of claim 1, further comprising a means to locate said apparatus in relative position to a user.

6. The apparatus of claim 1, wherein the plurality of connectors comprises a plurality of u-bends.

7. The apparatus of claim 1, wherein each of the plurality of connectors is formed with its respective string feature as a single piece.

8. The apparatus of claim 1, wherein each of the plurality of connectors is integral with its respective string feature.

9. A stringed-instrument training apparatus comprising:
- a base having a top side, wherein the base has a size similar to that of a human hand; and
- a plurality of string-features formed on the top side of the base, wherein each of the plurality of string-features comprises:
  - a strip with a width, and a length, where a first lengthwise edge engages one of a plurality of connectors and a second lengthwise edge is exposed;
- wherein the connectors are disposed on the base and configured to restrict lengthwise bending of the strips;
- wherein the width of each strip is selected to engage a finger, wherein each of the plurality of lengthwise edges is able to substantially impede the finger in a strumming direction; and
- wherein the each of the plurality of string-features is parallel to the others and adjacent string-features spaced apart by substantially the same distance as guitar strings.

10. The apparatus of claim 9, comprising three or more string-features.

11. The apparatus of claim 9, wherein each strip has a thickness greater than about 0.005 inch and less than about 0.25 inch.

12. The apparatus of claim 9, further comprising a means to attach the apparatus to a user.

13. The apparatus of claim 9, having the width at least partially embedded in the base.

14. The apparatus of claim 9, wherein the width above the top side is greater than 0.2 inches and less than 1.8 inches.

15. The apparatus of claim 9, further comprising at least one piezo-electric transducer.

16. The apparatus of claim 9, wherein the plurality of connectors comprises a plurality of u-bends.

17. The apparatus of claim 9, wherein each of the plurality of connectors is formed with its respective string feature as a single piece.

18. The apparatus of claim 9, wherein each of the plurality of connectors is integral with its respective string feature.

* * * * *